United States Patent [19]
Pagilagan

[11] Patent Number: 5,929,200
[45] Date of Patent: Jul. 27, 1999

[54] POLYAMIDES HAVING IMPROVED COLOR AND PROCESSIBILITY AND PROCESS FOR MANUFACTURING

[75] Inventor: Rolando Umali Pagilagan, Parkersburg, W. Va.

[73] Assignee: E. I. du Pont de Nemours and Company, Wilmington, Del.

[21] Appl. No.: 08/822,886

[22] Filed: Mar. 24, 1997

Related U.S. Application Data

[63] Continuation of application No. 08/499,337, Jul. 7, 1995, abandoned, which is a continuation of application No. 08/197,083, Feb. 16, 1994, abandoned.

[51] Int. Cl.$^6$ .................................................. C08G 69/08
[52] U.S. Cl. ........................... 528/313; 528/319; 528/337
[58] Field of Search ..................... 528/313, 319, 528/337

[56] References Cited

U.S. PATENT DOCUMENTS

| | | | |
|---|---|---|---|
| 3,321,447 | 5/1967 | Kunde et al. ............................. | 260/78 |
| 3,579,483 | 5/1971 | Twilley et al. .......................... | 528/313 |
| 3,779,998 | 12/1973 | Hermann ................................ | 260/78 L |
| 3,840,500 | 10/1974 | Ryffel et al. ............................ | 528/319 |
| 3,898,198 | 8/1975 | McGrath ................................. | 260/78 |
| 4,111,869 | 9/1978 | Puffr et al. .............................. | 528/313 |
| 4,237,034 | 12/1980 | Tomka et al. ........................... | 524/397 |
| 4,490,521 | 12/1984 | Coffey et al. ........................... | 528/336 |
| 4,701,518 | 10/1987 | Osborn et al. .......................... | 428/336 |
| 4,749,776 | 6/1988 | Sentman et al. ........................ | 528/319 |
| 5,194,576 | 3/1993 | Poll et al. ............................... | 528/336 |
| 5,298,594 | 3/1994 | Yuo et al. ............................... | 528/313 |

FOREIGN PATENT DOCUMENTS

| | | | |
|---|---|---|---|
| 1520903 | 11/1969 | Germany ............................... | 528/313 |
| 43-11238 | 5/1968 | Japan ..................................... | 528/313 |
| 47-26676 | 7/1972 | Japan ..................................... | 528/313 |
| 48-14438 | 5/1973 | Japan ..................................... | 528/313 |
| 7010033 | 1/1971 | Netherlands ........................... | 524/313 |

*Primary Examiner*—Veronica P. Hoke

[57] ABSTRACT

Incorporation of certain phosphorus compounds in conjunction with certain multivalent metal compounds into a polyamide melt or a polyamide manufacturing polymerization process results in a polyamide having improved color properties.

6 Claims, No Drawings

POLYAMIDES HAVING IMPROVED COLOR AND PROCESSIBILITY AND PROCESS FOR MANUFACTURING

This is a continuation of application Ser. 08/499,337 filed Jul. 7, 1995 which is a continuation of application Ser. No. 08/197,083 filed Feb. 16, 1994, the latter of which is now abandoned.

BACKGROUND

This invention relates to polyamide resins having improved color and processibility and a process for manufacturing these resins. The polyamide resins prepared in accordance with the process of the present invention are particularly useful in molding and extrusion applications and are manufactured in the presence of certain phosphorus compounds in conjunction with certain multivalent metal compounds.

An object of the present invention is to provide polyamide resins which initially appear less yellow than the same resins having not been manufactured in accordance with the present invention. A further object of the present invention is to provide polyamide resins which undergo a lesser degree of color build-up (i.e., increase in yellowness) on storage as compared to the same resins having not been manufactured in accordance with the present invention. Furthermore, an object of the present invention is to provide polyamide resins which do not undergo significant molecular weight increases during subsequent melt processing operations.

It is generally known that when polyamide resins are manufactured according to conventionally known processes without the addition of conventional pigments, these resins tend to exhibit varying degrees of yellowness in initial color, with said yellowness increasing over time. The resins also generally exhibit increased yellowness when exposed to high temperatures during subsequent melt processing operations. For example, during molding and extrusion applications, a certain amount of the resin is subjected to repeated melting in the form of regrind, which generally results in the molded or extruded resin exhibiting increased yellowness. Therefore, considering the extended storage time for some of these resins and the repeated melting during molding and extrusion, there exists a need to provide a process for manufacturing improved polyamide resins which initially appear, and continue to appear over time, less yellow than the same resins not prepared in accordance with the present invention.

Polyamide resins and their preparation are well known in the art. They can be obtained, for example, by self-polymerization of monoaminomonocarboxylic acids, or by reacting a diamine with a diacid in substantially equimolar amounts. It is understood that reference herein to the amino acids, diamines, and dicarboxylic acids is intended to include the equivalent amide-forming derivatives thereof. Representative dicarboxylic acids include, for example, adipic acid, azelaic acid, pimelic acid, suberic acid, sebacic acid, dodecanedioic acid, isophthalic acid, and terephthalic acid, while representative diamines include, for example, hexamethylenediamine, octamethylenediamine, tetramethylenediamine, 2-methylpentamethylenediamine, decamethylenediamine, and dodecamethylenediamine. Representative amino acids include 6-aminocaproic acid, 11-aminoundecanoic acid, and 12-aminododecanoic acid. For purposes of this patent application, the above-identified compounds shall be referred to as "polyamide-forming reactants" and this term shall include combinations of the compounds, as well as individual compounds, provided the combination or individual compound can be polymerized to form polyamides.

It has now been observed that improved color (i.e., reduced yellowness) can be attained in polyamides by using certain phosphorus compounds. The phosphorus compounds serve as color stabilizers for the polyamides by reducing the degree of oxidative and thermal degradation. However, these phosphorus compounds also serve as polymerization catalysts and in addition, some serve as nucleating agents, as in U.S. Pat. No. 4,237,034. Nucleated polyamides generally have lower toughness compared to polyamides which have not been nucleated and thus, phosphorus compounds which function as nucleating agents are not particularly desirable in applications where a loss in toughness is not desired. To the extent that the phosphorus compounds act as polymerization catalysts, polyamides containing these phosphorus compounds, when remelted in an extruder or molding machine, undergo rapid polymerization resulting in molecular weight (RV) increases, particularly when the remelting is done under conditions of low moisture. These molecular weight increases consequently result in decreased melt flow of the polyamide in a molding machine or other apparatus. In molding and extrusion applications, generally, this decrease and change in melt flow of the polyamide is undesirable.

In the present invention, it has been found that the catalytic effect of certain phosphorus compounds on a polyamide polymerization process can be reduced or stopped completely by the addition therein of certain multivalent metal compounds without significantly and adversely affecting the phosphorus compound's desired effect of reducing resin color. The degree to which the phosphorus compound, acting as a catalyst, is deactivated depends on the amounts of phosphorus and multivalent metal compound added to the polymerization process or to the polyamide melt. For economical and efficient processing, some degree of catalytic effect is desired for increased throughput, especially when polymerization is conducted by a continuous mode process, which is, generally, a kinetically limited process.

SUMMARY OF THE INVENTION

A process has now been developed wherein certain phosphorus compounds, in conjunction with certain multivalent metal compounds, are incorporated into polyamides either during the polymerization process or after, within the ranges described herein, resulting in polyamide resins that not only exhibit improved initial color and color stability on storage, but that also do not undergo significant molecular weight increases during subsequent melt processing operations, as compared to polyamide resins prepared without these phosphorus compounds and multivalent metal compounds. Polyamide resins made by the process herein are useful in numerous molding applications (i.e., automobile parts, mechanical parts, electrical and electronic parts, molded gears, sports equipment, appliances, etc.) and extrusion applications (i.e., tubing, rods, filaments, films, etc.).

DETAILED DESCRIPTION OF THE INVENTION

The present invention relates to a process for manufacturing polyamide resins, said resins being particularly useful in molding and extrusion applications. The polyamide resins prepared in accordance with the process of the present invention, as compared to polyamide resins not so prepared, exhibit improved initial color (i.e., reduced yellowness) and color stability on storage. Furthermore, the polyamide resins prepared in accordance with the process of the present invention do not undergo significant molecular weight increases during subsequent melt processing operations.

More specifically, the process of the present invention comprises polymerizing polyamide-forming reactants in the presence of certain phosphorus compounds in conjunction with certain multivalent metal compounds. Alternatively, the process of the present invention comprises compounding into a polyamide melt certain phosphorus compounds in conjunction with certain multivalent metal compounds. Polymerization processes are well known and can be, for example, batch or continuous mode processes. The polymerization processes contemplated by the present invention are those processes generally used to manufacture well known polyamides, such as nylons 6, 11, 12, 66, 69, 610, 612 , and their copolymers from well known polyamide-forming reactants. The preferred polyamide-forming reactants to be used in the process of the present invention are those polyamide-forming reactants generally used to manufacture nylons 6, 66, 610 and 612.

The phosphorus compounds used in the process of the present invention, and their preparation, are well known in the art. These phosphorus compounds serve as color stabilizers and polymerization catalysts in nylons. They include phosphorous acids, their salts, and their organic esters. Examples of the phosphorous acids include hypophosphorous acid, orthophosphorous acid, pyrophosphorous acid, and diphosphorous acid. The phosphorous acid salts useful in the present invention include salts of Groups IA and IIA, manganese, zinc, aluminum, ammonia, and alkyl or cycloalkyl amines or diamines. Examples of the organic esters useful in the present invention include mono-, di-, and triesters of phosphorous acid. The organic esters useful in the process of the present invention do not have direct carbon-phosphorus bonds so that in the presence of water, said esters undergo hydrolysis and are converted to inorganic phosphorus acids or their salts. Hydrolysis of phosphorus esters containing carbon-phosphorus linkage produces organophosphorous acids or their salts. Metal salts of these organophosphorous acids generally act as nucleating agents in nylons (U.S.Pat. No. 4,237,034), which can result in an undesirable reduction in polymer toughness. The preferred phosphorus compounds for use in the process of the present invention are hypophosphorous acid, orthophosphorous acid, diphosphorous acid, and their respective salts. Sodium hypophosphite (SHP) is the most preferred phosphorus compound.

The above-described phosphorus compounds are added in an amount sufficient to constitute concentrations ranging from 0.097 to 1.582 mols phosphorus (in the phosphorus compound) per million grams polyamide, preferably from 0.194 to 1.129 mols phosphorus (in the phosphorus compound) per million grams polyamide. Although the phosphorus compound can be introduced at any point prior to, during, or after polymerization, it is preferable to add the phosphorus compound as early as possible (i.e., pre-polymerization). If added after polymerization, then initial color will not be improved but color stability during subsequent storage or processing will be improved.

The multivalent metal compounds used in the present invention serve as phosphorus catalyst deactivators, thereby significantly reducing any undesirable increase in the molecular weight of the polyamide during subsequent melt processing operations. For economical and efficient processing, it may be desirable to only partially deactivate the catalyst, particularly for increased manufacturing throughput, and especially when polymerization is conducted by a continuous mode method. The degree of phosphorus catalyst deactivation may be controlled by the amount of the phosphorus compound and the multivalent metal compound added to the polyamide.

The multivalent metal compound is introduced into the polymerization process, or alternatively into the polyamide melt, in an amount ranging from about 0.097 mol to about 50 mols multivalent metal compound per million grams polyamide, preferably from about 0.150 mol to about 5 mols multivalent metal pound per million grams polyamide. The multivalent metal compounds useful in the present invention are well known to one skilled in the art and include halides, nitrates, and carboxylate salts (i.e., acetates, proprionates, benzoates, stearates, etc.) of Group IIA metals, zinc and aluminum.

As stated above, the preparation of polyamides by polymerization processes can occur by generally known methods, such as a batch method or a continuous mode method. For example, in a conventional batch method, typically a 40–60% polyamide salt solution formed from equimolar amounts of diacid and diamine in water, is charged into a preevaporator vessel operated at a temperature of about 130–160° C. and a pressure of about 35–100 psia, wherein the polyamide salt solution is concentrated to about 70–80%. The concentrated solution is then transferred to an autoclave, wherein heating is continued as the pressure in the vessel rises to about 160–600 psia, generally 195–300 psia. Additional water, in the form of steam is allowed to vent until the batch temperature reaches about 220–260° C. The pressure is then reduced slowly (about 60–90 minutes) to between about 15 and 1 psia. The molecular weight of the polymer is controlled by the hold time and pressure at this stage. Salt concentration, pressure, and temperature may vary depending on the specific polyamide being processed. After the desired hold time, the polyamide is then extruded into strand, cooled, and cut into pellets.

In this batch process, the phosphorus compound and the multivalent metal compound can be added before polymerization (i.e., into a solution of at least one polyamide-forming reactant), or can be introduced at any point during polymerization, or can even be introduced post- polymerization (i.e., by incorporating the phosphorus compound and the multivalent metal compound into a polyamide melt, using conventional mixing equipment, such as an extruder). The phosphorus compound and multivalent metal compound can be introduced separately or all at once. However, for best results, and especially for protection against oxidation and thermal degradation, the phosphorus compound and the multivalent metal compound should be added as early as possible in the polymerization process, preferably at the beginning of the polymerization process. Additionally, they can be added in solid form or in the form of aqueous solutions.

Continuous polymerizations are also well known in the art (See U.S. Pat. No. 3,947,424). For example, in a typical continuous polymerization method, the polyamide salt solution is preheated in a preheater vessel to about 40–90° C., then transferred into a pre-evaporator/reactor where the salt solution is concentrated at about 195–300 psia and about 200–260° C. to about 70–90%, resulting in a low molecular weight polymer. The low molecular weight polymer is then discharged into a flasher, where the pressure is slowly reduced to below 15 psia and then discharged into a vessel maintained below atmospheric pressure and at a temperature of about 270–300° C. to effect removal of water and to promote further molecular weight increase. The polyamide melt is then extruded into a strand, cooled, and cut into pellets.

As in the batch method, the phosphorus compound and multivalent metal compound can be incorporated at any point during the process, including post-polymerization (i.e., by compounding them into the polyamide melt, etc.). However, for maximum antioxidant and thermal protection, and for optimum catalyst deactivation, it is recommended that the phosphorus compounds and multivalent metal compounds be added prior to polymerization or as early as possible.

Additionally, it is understood that the polyamides prepared by the process of the present invention may also contain conventional additives such as pigments and dyes, flame retardants, lubricants, optical brighteners, organic antioxidants, plasticizers, heat stabilizers, ultraviolet light stabilizers, nucleating agents, tougheners, and reinforcing agents.

EXAMPLES

The examples that follow and corresponding tables further illustrate the present invention.

The resins in the following were analyzed for molecular weight (RV), as measured in accordance with ASTM D789, and Yellowness Index (YI), as measured in accordance with ASTM D1925 using a Hunter Instrument Model D25M-9. YI is a measure of the degree of yellowness exhibited by a resin. The lower the YI value, the less yellow the resin appears.

In the tables below, the following definitions apply:

"P" refers to phosphorus in SHP;

"Initial RV" refers to the molecular weight of the sample before solid phase polymerization at 180° C. for 3 hours; and "Final RV" refers to the molecular weight of the sample after solid phase polymerization at 180° C. for 3 hours.

Continuous Polymerization Process:

A nylon 66 salt solution with a pH of 7.45 and nylon salt concentration of about 51.5 weight percent was pumped into a preheater at a rate of 4950 lb/hr, where it was heated from about 41° C. to about 55° C. The nylon salt solution was then pumped into a prepolymerizer operating at around 235° C. and 225 psia, where it was concentrated to about 90% nylon salt, and wherein the monomers were converted to low molecular weight polymer. This low molecular weight polymeric material was then discharged from the prepolymerizer into a flasher, where the pressure was slowly reduced and the material was then discharged from the flasher into a vessel maintained below atmospheric pressure and at a temperature of about 283° C., where removal of water and further molecular weight (RV) increase were effected. The resulting polyamide melt was then extruded through circular die holes at about 283° C., quenched with water, and cut into pellets. This resin is designated C1. The following resins were prepared in this manner with the below-stated modifications:

Example 1-1 was prepared as described above with the addition of 62 ppm of sodium hypophosphite monohydrate (SHP). The SHP was added as an aqueous solution to the nylon 66 salt solution. It is noted that in Examples 1-1 to 1-4, all additions of SHP were in the form of aqueous solutions containing a sufficient amount of SHP to yield the desired amount of SHP (in ppm) in the polyamide.

Example 1-2 was prepared as described above with the addition of 101 ppm of SHP to the nylon salt solution. Additionally, 500 ppm of calcium acetate was added to the nylon melt just before the die.

Example 1-3 was prepared as described above with the addition of 184 ppm of SHP to the nylon salt solution. Additionally, 850 ppm of calcium acetate was added to the nylon melt just before the die Example 1-4 was prepared as described above with the addition 103 ppm of SHP to the nylon salt solution. Additionally, 1000 ppm of aluminum distearate was added to the nylon melt just before the die YI values for C1 and Examples 1-1 to 1-4 are given in TABLE I. Examples 1-1 to 1-4, which contained SHP, exhibited much lower YI values than C1 which did not contain SHP.

TABLE I

| Eg. | SHP (ppm) | Metal Compound (ppm) | Metal/P Ratio | YI |
|---|---|---|---|---|
| C1 | 0 | 0 | — | 3.4 |
| 1-1 | 62 | 0 | 0 | −2.1 |
| 1-2 | 101 | Calcium Acetate 500 | 2.75 | −1.2 |
| 1-3 | 184 | Calcium Acetate 850 | 2.57 | −1.8 |
| 1-4 | 103 | Aluminum Distearate 1000 | 1.4 | −1.5 |

TABLE II, below, illustrates improved color stability on storage. The examples were initially tested for YI values at the indicated time intervals over a period of 180 days. It is shown that the color build-up in C1 was greater than the color build-up in Example 1-1, 1-2, 1-3 and 1-4, which contained SHP in the amounts given above. Each of Examples 1-1 to 1-4 exhibited a YI value that was significantly better (lower) than the YI value exhibited by C1.

TABLE II

| Eg. | YI Initial | YI 60 Days | YI 90 Days | YI 120 Days | YI 150 Days | YI 180 Days |
|---|---|---|---|---|---|---|
| C1 | 3.4 | 7.6 | 8.7 | 9.6 | 10.4 | 10.1 |
| 1-1 | −2.1 | −1.6[a] | −1.4[b] | −1.2[c] | — | −0.1[d] |
| 1-2 | −1.2 | 0.9 | 1.0 | 1.6 | 2.0 | 1.7 |
| 1-3 | −1.8 | −0.5 | −0.4 | 0.3 | 0.8 | 0.7 |
| 1-4 | −1.5 | 0 | 0.6 | 0.8 | 1.1 | 0.8 |

[a]YI tested after 63 days.
[b]YI tested after 87 days.
[c]YI tested after 112 days.
[d]YI tested after 174 days.

The polymers of C1 and Examples 1-1 to 1-4 were each subjected to solid phase polymerization at 180° C. for 3 hours. The molecular weights (RV) of the resulting polymers were measured and reported in TABLE III below. Note that after preparation of each example the initial RV was measured before the polymer was subjected to solid phase polymerization. Also shown in TABLE III is the increase in molecular weight resulting from the solid phase polymerization. The larger the RV increase, the greater the catalytic effect on polymerization. The data reported for C1 shows the normal increase in RV for nylon 66 under the described conditions. Example 1-1 illustrates the effect of SHP on polymerization. Examples 1-2 to 1-show the effect of the multivalent metal compounds on the rate of polymerization. The RV increase for Examples 1-2 to 1-4 were comparable to C1.

TABLE III

| Eg. | Metal/P Molar Ratio | Initial RV | Final RV | RV Increase |
|---|---|---|---|---|
| C1 | — | 51.8 | 81.5 | 29.7 |
| 1-1 | — | 52.0 | 200.8 | 148.8 |
| 1-2 | 2.75 | 52.8 | 76.7 | 23.9 |
| 1-3 | 2.57 | 52.8 | 76.6 | 23.9 |
| 1-4 | 1.40 | 52.2 | 80.7 | 28.5 |

Batch Process

A 5470 lb nylon 66 salt solution, prepared from hexamethylenediamine and adipic acid in water, with a pH of around 8.0 and a nylon salt concentration of 50.85%, was charged into a preevaporator. Then 220 g of a 10% solution of a conventional antifoam agent was added to the solution. The resulting solution was then concentrated to 80% at 35 psia. The concentrated solution was then charged into an autoclave and heated, while the pressure was allowed to rise to 265 psia. Steam was vented and heating was continued until the temperature of the batch reached 255° C. The pressure was then reduced slowly to 14.7 psia, while the batch temperature was allowed to further rise to 280° C. Pressure was then held at 14.7 psia and temperatures were held at 280° C. for 30 minutes. Finally, the polymer melt was extruded into strand, cooled, cut into pellets, and dried at 160° C. under nitrogen. This polymer is referred to as C2 in the following tables.

Using essentially the same batch process and identical amounts of the same reactants used to prepare C2, additional polymers were prepared in the presence of a phosphorus compound as follows:

Example 2-was prepared the same as C2, with the exception that 109 grams of SHP were dissolved in 1 gallon of demineralized water and this solution was added to the autoclave containing the 80% concentrated nylon salt solution.

Example 2-2 was prepared the same as C2 with the exception that 109 grams of SHP and 9.2 grams of cobalt aluminate pigment were dissolved in 5 gallons of demineralized water. This suspension (noting that cobalt aluminate pigment does not dissolve in water) was added to the autoclave containing the 80% concentrated nylon salt solution.

YI values for C2 and Examples 2-1 and 2-2 are given in TABLE IV below. Examples 2-1 and 2-2 , which contained SHP. exhibited much lower YI values than C2 which did not contain SHP.

TABLE IV

| Eg. | SHP (ppm) | Cobalt Pigment (ppm) | YI |
|---|---|---|---|
| C2 | 0 | 0 | 5.4 |
| 2-1 | 83 | 0 | -4.7 |
| 2-2 | 83 | 8.5 | -9.9 |

To analyze the effect of multivalent metal compounds on the catalytic effect of SHP, the polymer of Example 2-2 above was melt blended in a 28 mm Werner & Pfleiderer twin-screw extruder under atmospheric pressure at a temperature of about 280° C. to 300° C. with various multivalent metal compounds as indicated in TABlE V. The polymer melt was then extruded through a circular die, cooled and cut into pellets. The resulting polymers are listed in TABLE V as Examples 3-1 to 3-6. The compositions are shown in the table.

As controls, the polymers of Examples C2 and 2-2 were remelted in an extruder at about 283° C. and then extruded through a circular die, cooled, and cut into pellets. These controls are referred to as "C3" and "C4", respectively, in TABLE V. The initial RV was then measured for each polymer.

The catalytic activity of SHP in the polymers of C3, C4, and Examples 3-1 to 3-6 and the catalyst deactivating effect of the multivalent metal compounds in the polymers of Examples 3-1 to 3-6 was determined after the polymers were subjected to solid phase polymerization at 180° C. for 3 hours. The results, summarized in TABLE V, show that C4, which contained SHP without a multivalent metal compound exhibited the greatest RV increase. Examples 3-1 to 3-6 , which contained multivalent metal compounds in conjunction with SHP showed RV increases which were comparable to the polymer of C3 (nylon 66 with neither SHP nor multivalent metal compound).

TABLE V

| Eg. | SHP (ppm) | Cobalt* (ppm) | Multivalent Metal Compound | Initial RV | Final RV | RV Increase |
|---|---|---|---|---|---|---|
| C3 | 0 | 0 | — | 51.1 | 79.0 | 27.9 |
| C4 | 83 | 8.5 | — | 51.1 | 215.1 | 164.0 |
| 3-1 | 83 | 8.5 | Calcium Acetate Monohydrate 500 ppm | 49.2 | 74.6 | 25.4 |
| 3-2 | 83 | 8.5 | Calcium Acetate Monohydrate 1,000 ppm | 48.6 | 73.4 | 24.8 |
| 3-3 | 83 | 8.5 | Aluminum Distearate 1,000 ppm | 50.4 | 75.9 | 25.5 |
| 3-4 | 83 | 8.5 | Zinc Stearate 1,000 ppm | 50.7 | 76.1 | 25.4 |
| 3-5 | 83 | 8.5 | Barium Acetate 500 ppm | 51.3 | 74.7 | 23.4 |
| 3-6 | 83 | 8.5 | Calcium Bromide 500 ppm | 51.3 | 77.5 | 26.2 |

*Cobalt Aluminate Pigment

What is claimed is:

1. A process for preparing a polyamide composition comprising polymerizing at least one polyamide-forming reactant to form nylon 6,11,12,66,69,610,612 or copolymers therof, in the presence of, or introducing into a polyamide melt:
   (a) a phosphorus compound selected from the group consisting of
      (1) phosphorous acids;
      (2) phosphorous acid salts selected from the group consisting of phosphorous acid salts of Group IA and IIA, metals, manganese, aluminum, ammonia, and alkyl and cycloalkyl amines and diamines; and
      (3) phosphorous organic esters which undergo hydrolysis in the presence of water to form inorganic phosphorous acids or salts; and
   (b) a multivalent metal compound selected from the group consisting of carboxylate and water soluble compounds of Group IIA aluminum;
wherein the phosphorus compound is added in an amount sufficient to yield a phosphorus concentration ranging from about 0.097 mol to about 1.582 mols phosphorus per million grams polyamide, and the multivalent metal compound is added in an amount sufficient to yield a multivalent metal compound concentration ranging from about 0.097 mol to about 50 mols per million grams polyamide.

2. A process for preparing a polyamide composition comprising polymerizing at least one polyamide-forming reactant in the presence of, or introduing into a polyamide melt, wherein the polyamide melt is nylon 6,11,12,66,69, 610,612 or copolymers thereof,
(a) phosphorous compound selected from the group consisting of
(1) phosphorous acids;
(2) phosphorous acid salts selected from the group consisting of phosphorous acid salts of Group IA and IIA, metals, manganese, aluminum, ammonia, and alkyl and cycloalkyl amines and diamines; and
(3) phosphorous organic esters which undergo hydrolysis in the presence of water to form inorganic phosphorous acids or salts; and
(b) a multivalent metal compound selected from the group consisting of carboxylate and water soluble compounds of Group IIA and aluminum;
wherein the phosphorus compound is added in an amount sufficient to yield a phosphorus concentration ranging from about 0.097 mol to about 1.582 mols phosphorus per million grams polyamide, and the multivalent metal compound is added in an amount sufficient to yield a multivalent metal compound concentration ranging from about 0.097 mol to about 50 mols per million grams polyamide.

3. The process of claim 2, wherein the at least one polyamide-forming reactant is polymerized to form nylon 6, 11, 12, 66, 69, 610, 612 or copolymers thereof.

4. A process for preparing a polyamide composition comprising polymerizing at least one polyamide-forming reactant to form nylon 6, 11, 12, 66, 69, 610, 612 or copolymers thereof in the presence of, or introducing into a polyamide melt:
(a) a phosphorus compound selected from the group consisting of
(1) phosphorous acids;
(2) phosphorous acid salts selected from the group consisting of phosphorous acid salts of Group IA and IIA metals, manganese, zinc, aluminum ammonia, and alkyl and cycloalkyl amines and diamines; and
(3) phosphorous organic esters which undergo hydrolysis in the presence of water to form inorganic phosphorous acids or salts; and
(b) a multivalent metal compound selected from the group consisting of carboxylate and water soluble compounds of zinc;
wherein the phosphorus compound is added in an amount sufficient to yield a phosphorus concentration ranging from about 0.097 mols to about 1.582 mols phosphorus per million grams polyamide, and the multivalent metal compound is added in an amount sufficient to yield a zinc concentration ranging from about 0.097 mols to about 1.582 mols zinc per million grams polyamide.

5. The process of claim 4 wherein the polyamide melt is nylon 6, 11, 12, 66, 69, 610, 612 or copolymers thereof.

6. A process for preparing a polyamide composition comprising;
(a) polymerizing at least one polyamide-forming reactant to form nylon 6, 11, 12, 66, 69, 610, 612 or copolymers thereof in the presence of a phosphorus compound selected from the group consisting of
(1) phosphorous acids;
(2) phosphorous acid salts selected from the group consisting of phosphorous acid salts of Group IA and IIA metals, manganese, zinc, aluminum, ammonia, and alkyl and cycloalkyl amines and diamincs; and
(3) phosphorous organic esters which undergo hydrolysis in the presence of water to form inorganic phosphorous acids or salts, to form a polyamide melt; and
(b) introducing into said polyamide melt a multivalent metal compound selected from the group consisting of carboxylate and water soluble compounds of zinc;
wherein the phosphorus compound is added in an amount sufficient to yield a phosphorus concentration ranging from about 0.097 mol to about 1.582 mols phosphorus per million grams polyamide, and the multivalent metal compound is added in an amount sufficient to yield a zinc concentration ranging from about 0.097 mol to about 1.582 mols zinc per million grams polyamide.

* * * * *